US005550416A

United States Patent [19]

Fanchang et al.

[11] Patent Number: 5,550,416

[45] Date of Patent: Aug. 27, 1996

[54] CONTROL MECHANISM OF REVOLVING SPEED OF AN ELECTRIC TOOL

[76] Inventors: We C. Fanchang; Hsueh W. Hsueh, both of P.O. Box 1750, Taichung, Taiwan

[21] Appl. No.: 386,164

[22] Filed: Feb. 9, 1995

[51] Int. Cl.[6] .............................. H02K 7/14; H02K 7/06; H02K 7/10; E21B 3/00

[52] U.S. Cl. ................................ 310/83; 310/47; 310/50; 173/216; 173/217

[58] Field of Search .................................. 310/47, 50, 83; 173/216, 217; 475/297, 298

[56] References Cited

U.S. PATENT DOCUMENTS

| | | | |
|---|---|---|---|
| 4,493,223 | 1/1985 | Kishi et al. | 74/371 |
| 4,617,837 | 10/1986 | Kataoka et al. | 74/785 |
| 4,641,551 | 2/1987 | Pascaloff | 74/785 |
| 4,772,765 | 9/1988 | Markle et al. | 200/1 V |
| 4,791,833 | 12/1988 | Sakai et al. | 74/769 |
| 4,892,013 | 1/1990 | Satoh | 74/785 |
| 5,019,023 | 5/1991 | Kurosawa | 475/269 |
| 5,339,908 | 8/1994 | Yokota et al. | 173/216 |

*Primary Examiner*—Steven L. Stephan
*Assistant Examiner*—Michael Wallace, Jr.
*Attorney, Agent, or Firm*—Charles E. Baxley, Esq.

[57] ABSTRACT

A control mechanism of revolving speed of an electric tool comprises a speed changing mechanism and a speed selecting device. The speed changing mechanism is composed of an action ring, a locating ring and two slide rods. The control of revolving speed of the electric tool is brought about easily and precisely by means of the speed changing mechanism in conjunction with the speed selecting device which is composed of a seat, a locating frame fastened to the main body of the electric tool, and a push button.

4 Claims, 7 Drawing Sheets

CONTROL MECHANISM OF REVOLVING SPEED OF AN ELECTRIC TOOL

FIELD OF THE INVENTION

The present invention relates generally to an electric tool, and more particularly to a control mechanism of revolving speed of the electric tool.

BACKGROUND OF THE INVENTION

As shown in FIG. 2, the control mechanism of revolving speed of an electric tool is generally composed of a gear set seat 1, a gear set A 20, a gear set B 21, a gear set C 22, a fixing toothed sleeve 28, a sliding toothed ring 24, etc. In addition, the control mechanism is provided with a push button switch in conjunction with a connection rod action mechanism. In operation, the push button switch is moved back and forth so as to cause the connection rod to actuate the sliding toothed ring 24 to move back and forth to cause the outer ring teeth 240 to engage or disengage the ring teeth 230 located on the inner wall of the fixing toothed sleeve 23. When the sliding toothed ring 24 is moved forward to engage the fixing toothed sleeve 23, the gear set B 21 which is engaged with the sliding toothed sleeve 24 is activated to reduce the revolving speed of the hand tool. On the other hand, when the sliding toothed ring 24 is caused to move rearwards so as to disengage the fixing toothed sleeve 23, the sliding toothed ring 24 and the gear set B 21 are idled so that the gear set B 21 does not act to reduce the revolving speed of the electric tool, thereby unabling the electric tool to revolve at a high speed.

Such a control mechanism of revolving speed of the electric tool as described above has inherently two shortcomings, which are described hereinafter.

When an electric tool, which is operating at a high speed, is switched to operate at a lower speed, the outer ring teeth 240 of the sliding toothed ring 24 are not so located as to be ready to engage the ring teeth 230 of the fixing toothed sleeve 23. As a result, the push button switch can not be directly switched into a low speed position. Therefore, a tool operator is required to press continuously the push-button switch until such time when the sliding toothed ring 24 is actuated to engage the fixing toothed sleeve 23. It is therefore readily apparent that it is undesirable to employ the push-button switch in conjunction with the connection rod mechanisim. In addition, the sliding toothed ring 24 is susceptible to tripping caused by a reaction force brought about by the electric tool which is operated under a torsional stress that is slightly greater than normal. Such a tripping incident of the sliding toothed ring 24 as described above can result in the idling of the electric tool.

SUMMARY OF THE INVENTION

It is therefore the primary objective of the present invention to provide an improved control mechanism of revolving speed of an electric tool, which comprises a speed changing mechanism and a speed selecting device. The speed changing mechanism is composed of an action ring, a locating ring and two slide rods. The control of revolving speed of the electric tool can be brought about easily and precisely by means of the speed changing mechanism in conjunction with the speed selecting device.

The foregoing objective, features and advantages of the present invention will be more readily understood upon a thoughtful deliberation of the following detailed description of the present invention in conjunction with the accompanying drawings.

DETAILED DESCRIPTION OF THE INVENTION

Figure 1:
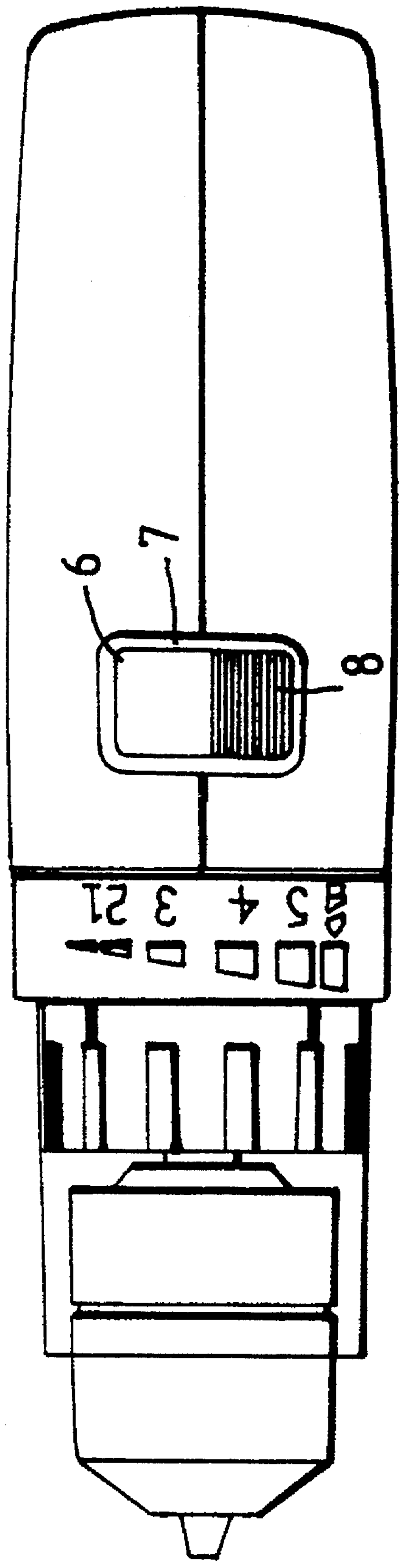
FIG. 1 shows a top plan view of an electric tool of the present invention.
Figure 2:
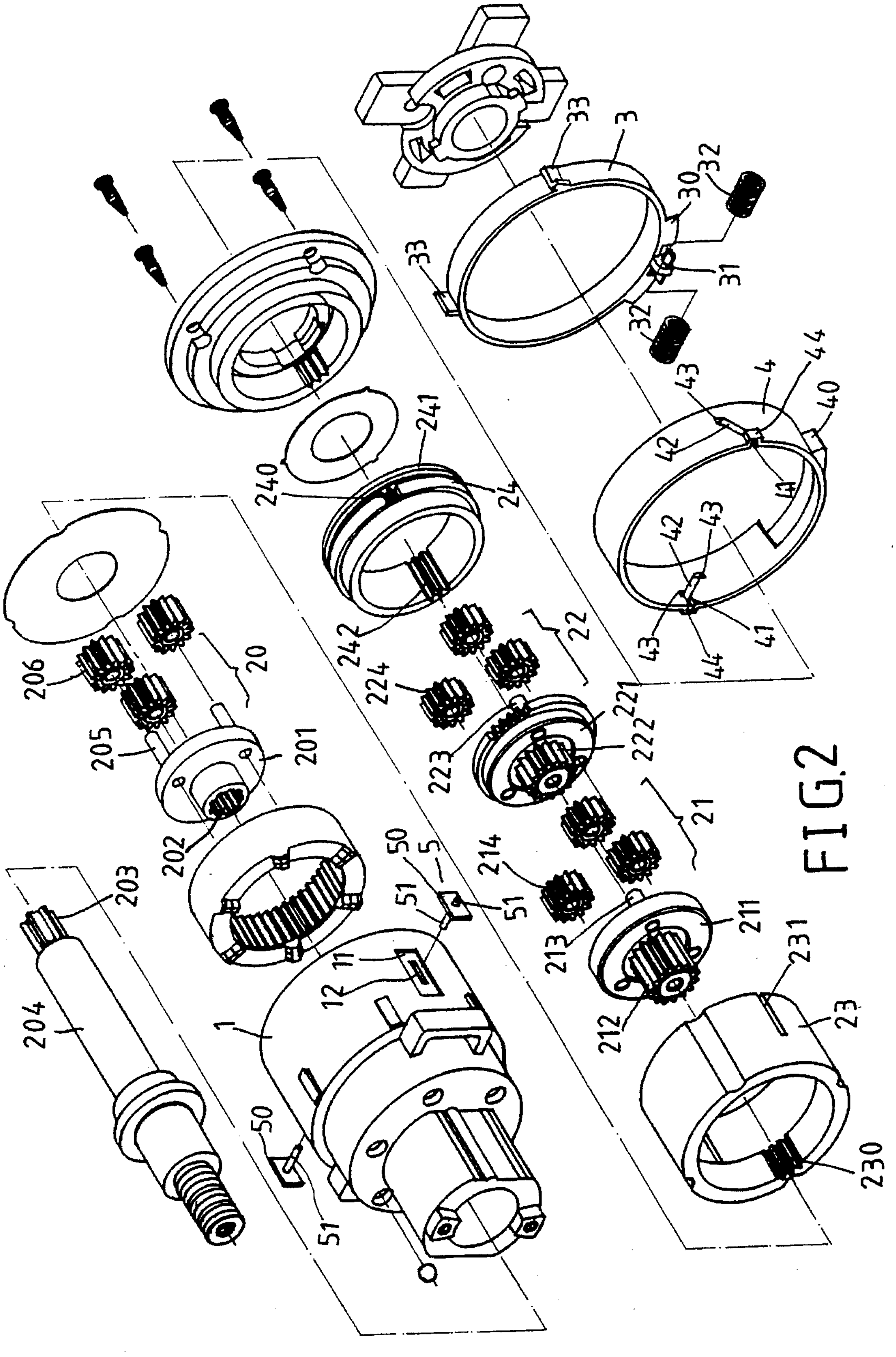
FIG. 2 shows a partial exploded view of the present invention.
Figure 3:
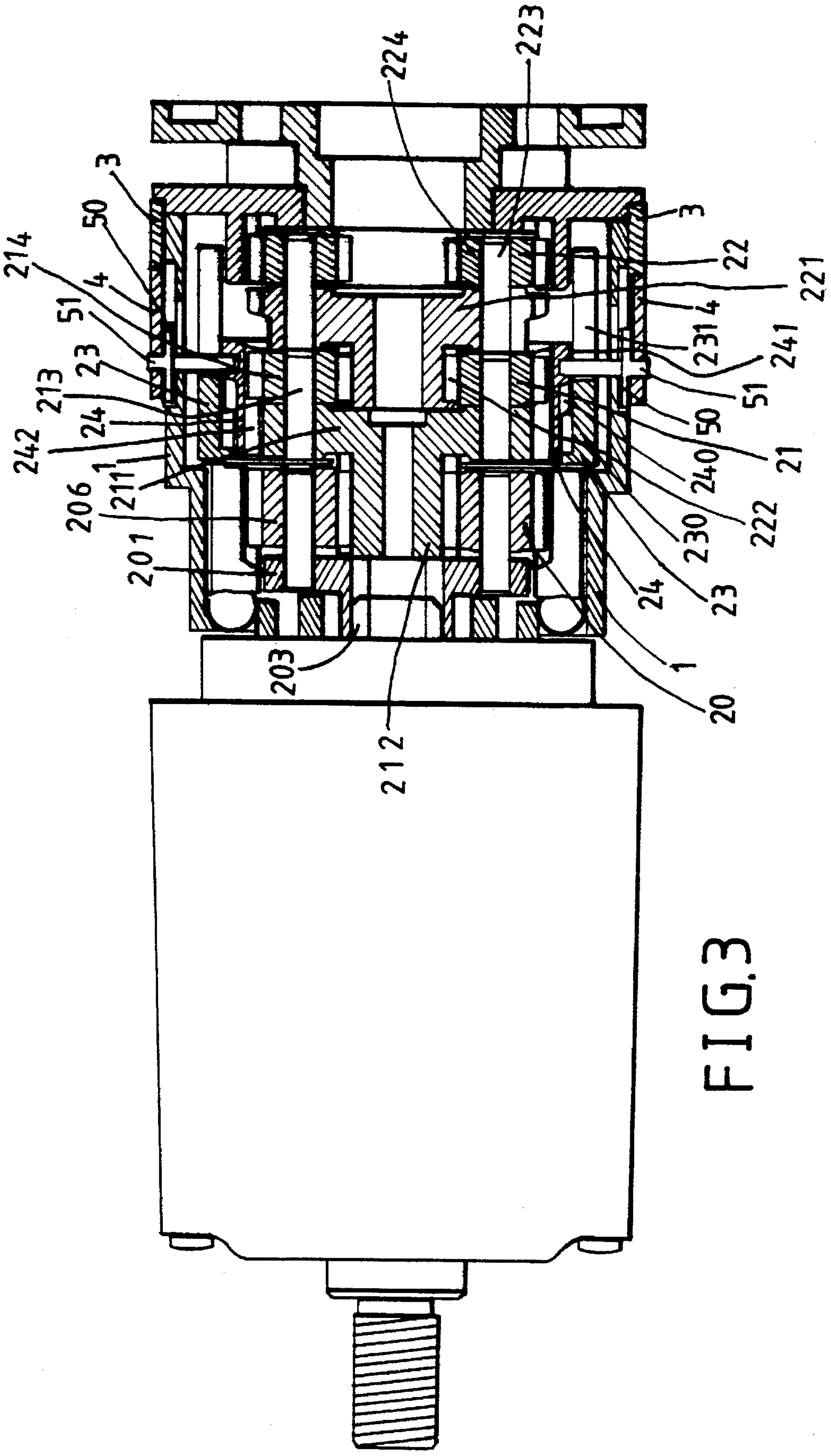
FIG. 3 shows a sectional view of the present invention.

As shown in FIGS. 1 and 2, an electric tool of the present invention is similar in construction to the prior art electric tool and is composed of a gear set seat 1, a gear set A 20, a gear set B 21, a gear set C 22, a fixing toothed sleeve 23, and a sliding toothed ring 24. The gear set A 20 includes a disc 201 having an inner gear 202 engaged with a pinion 203 of an output shaft 204 and includes three pinions 206 rotatably engaged on three projections 205 which are secured to the disc 201. The gear set B 21 includes a disc 211 having a pinion 212 engaged with the pinions 206 and having three pins 213 extended therefrom for rotatably supporting three pinions 214 thereon. The gear set C 22 includes a disc 221 having a pinion 222 engaged with the pinions 214 and having three pins 223 extended therefrom for rotatably supporting three pinions 224 thereon. The pinions 224 are provided for engaging with an input shaft. A sliding toothed ring 24 includes an inner ring teeth 242 for engaging with the pinions 214 and includes an outer ring teeth 240 for engaging with an inner teeth 230 of a fixing toothed sleeve 23. The sliding toothed ring 24 is movable toward the fixing toothed sleeve 23 so as to engage the outer ring teeth 242 with the inner ring teeth 230 of the fixing toothed sleeve 23, and is movable away from the fixing toothed sleeve 23 so as to disengage the outer ring teeth 242 from the inner ring teeth 230 of the fixing toothed sleeve 23. These component parts as mentioned above are not the focus of the subject matter of the present invention and will not be therefore discussed hereinafter.

The control mechanism of revolving speed of the electric tool of the present invention comprises mainly a speed changing mechanism and a speed selecting device. The speed changing mechanism comprises mainly an action ring 3, a locating ring 4 and two slide rods 5. The action ring 3 is provided with a sector piece 30 which is in turn provided centrally with a spring seat 31 for locating two springs 32. The action ring 3 is further provided with two protruded pieces 33 different in shape from each other. The locating ring 4 is provided with a sector seat 40 of a hollow construction, in which the spring seat 31 and the two springs 32 are disposed such that the outer ends of the two springs 32 urge two side walls of the sector seat 40, as shown in FIG.

6. As a result, the locating ring 4 and the action ring 3 can be actuated at the same time. The locating ring 4 is further provided correspondingly with two slots 41 located respectively in the left and the right sides of the frontend thereof. The slot 41 is provided rearwards with a slanted slot 42 having respectively at both ends thereof a curve locating slot 43. The slot 41 is provided in the outer side thereof with an inverted U-shaped frame 44 which is connected with the body of the locating ring 4 for reinforcing the structural strength of the locating ring 4. The two slide rods 5 are respectively made up of a sliding piece 50 and a sliding bar 51.

Figure 4:
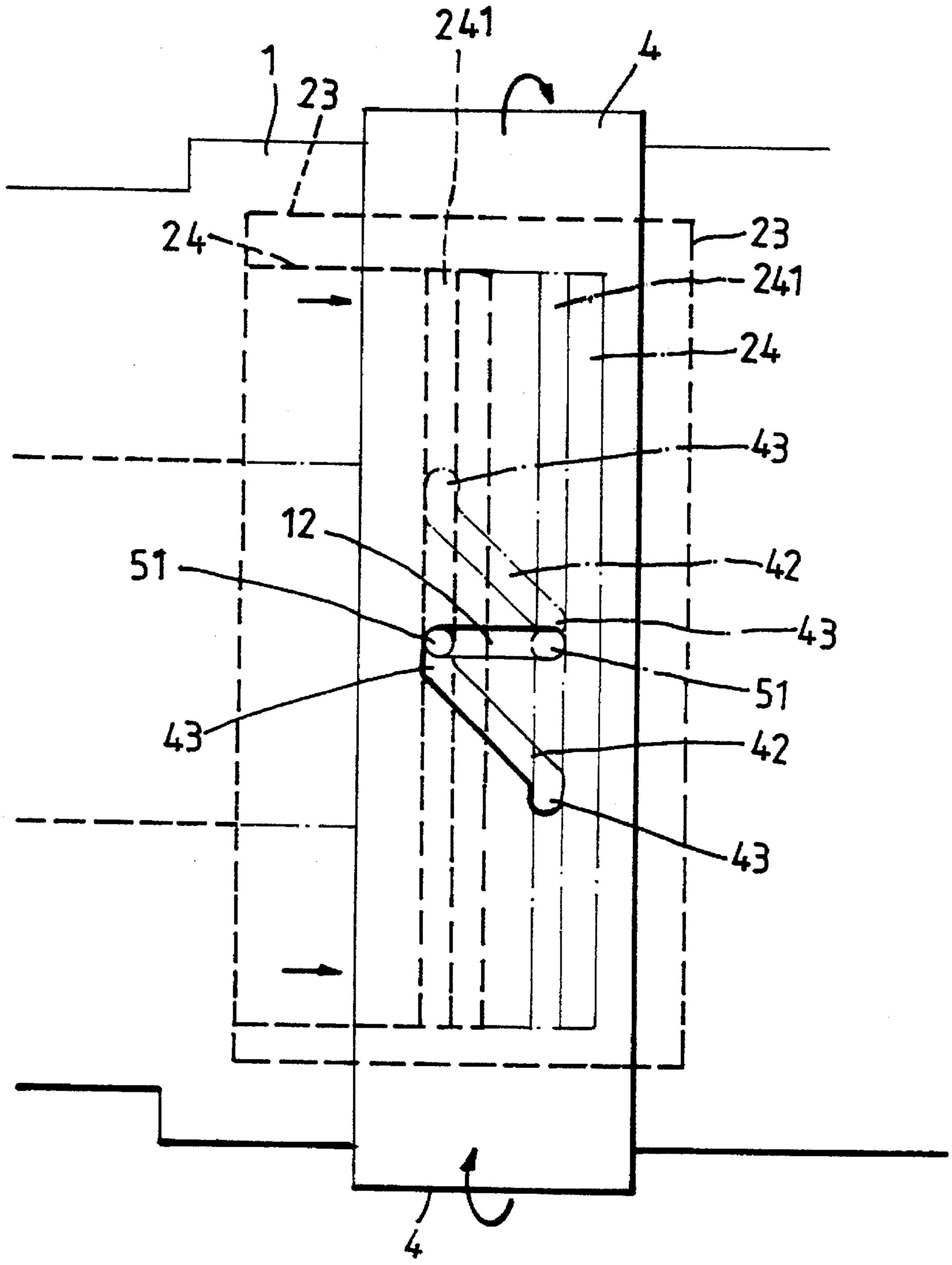
FIG. 4 shows a schematic view of the present invention at work.

As illustrated in FIGS. 1 and 4, the gear set seat 1 of the present invention is provided respectively in two sides thereof with a long slot 11 and a strip hole 12, in which the sliding piece 50 and the sliding bar 51 are received such that the sliding bar 51 reaches one end of the strip hole 12 so as to pass through both ends of the slot 231 of the fixing toothed sleeve 23. The end of the sliding bar 51 is located in the ring slot 241 of the sliding toothed ring 24. As a result, when the slide rod 5 is moved back and forth in the long slot 11 and the strip hole 12, the sliding toothed ring 24 is actuated steadily to move back and forth by the slide bar 51 in order to allow the outer ring teeth 242 of the sliding toothed ring 24 to engage with the inner ring teeth 230 of the fixing toothed sleeve 23. When the outer ring teeth 242 of the sliding toothed ring 24 is engaged with the inner ring teeth 230 of the fixing toothed sleeve 23, the pinions 214 of the gear set B 21 may be caused to rotate within the sliding toothed ring 24 in order to reduce the revolving speed of the hand tool. However, when the outer ring teeth 242 of the sliding toothed ring 24 is disengaged from the inner ring teeth 230 of the fixing toothed sleeve 23, the pinions 214 of the gear set B 21 and the sliding toothed ring 24 are idled such that the gear set B 21 does not act to reduce the revolving speed of the hand tool. The outer end of the slide bar 51 is located in the slanted slot 42 via the slot 41 of the locating ring 4. When the locating ring 4 is actuated by the action ring 3, the sliding bar 51 is caused to slide back and forth by the slanted slot 42. When the sliding bar 51 is located at a high or low revolving position, the outer end of each sliding bar 51 is moved into the locating slot 43 securely.

Figure 5:
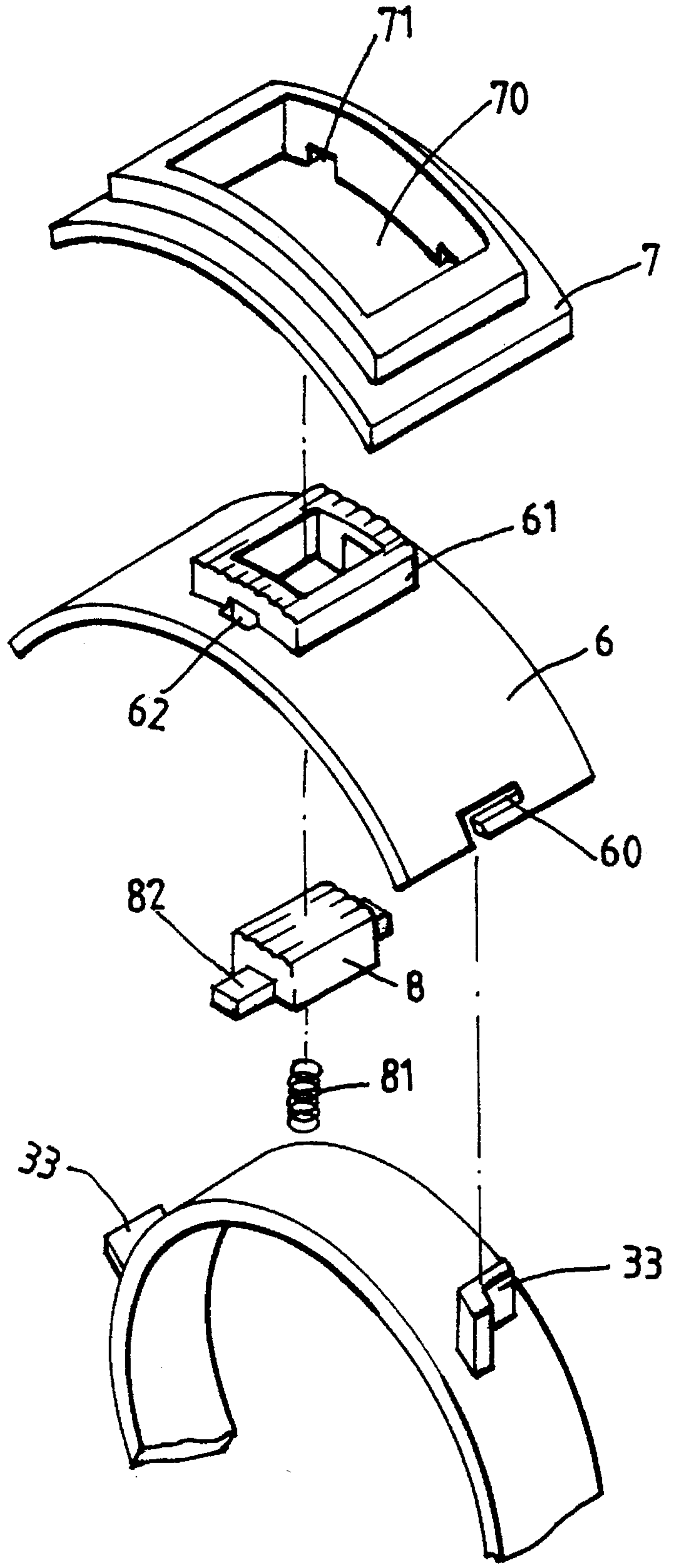
FIG. 5 shows an exploded view of the speed selecting device of the present invention.
Figure 6:
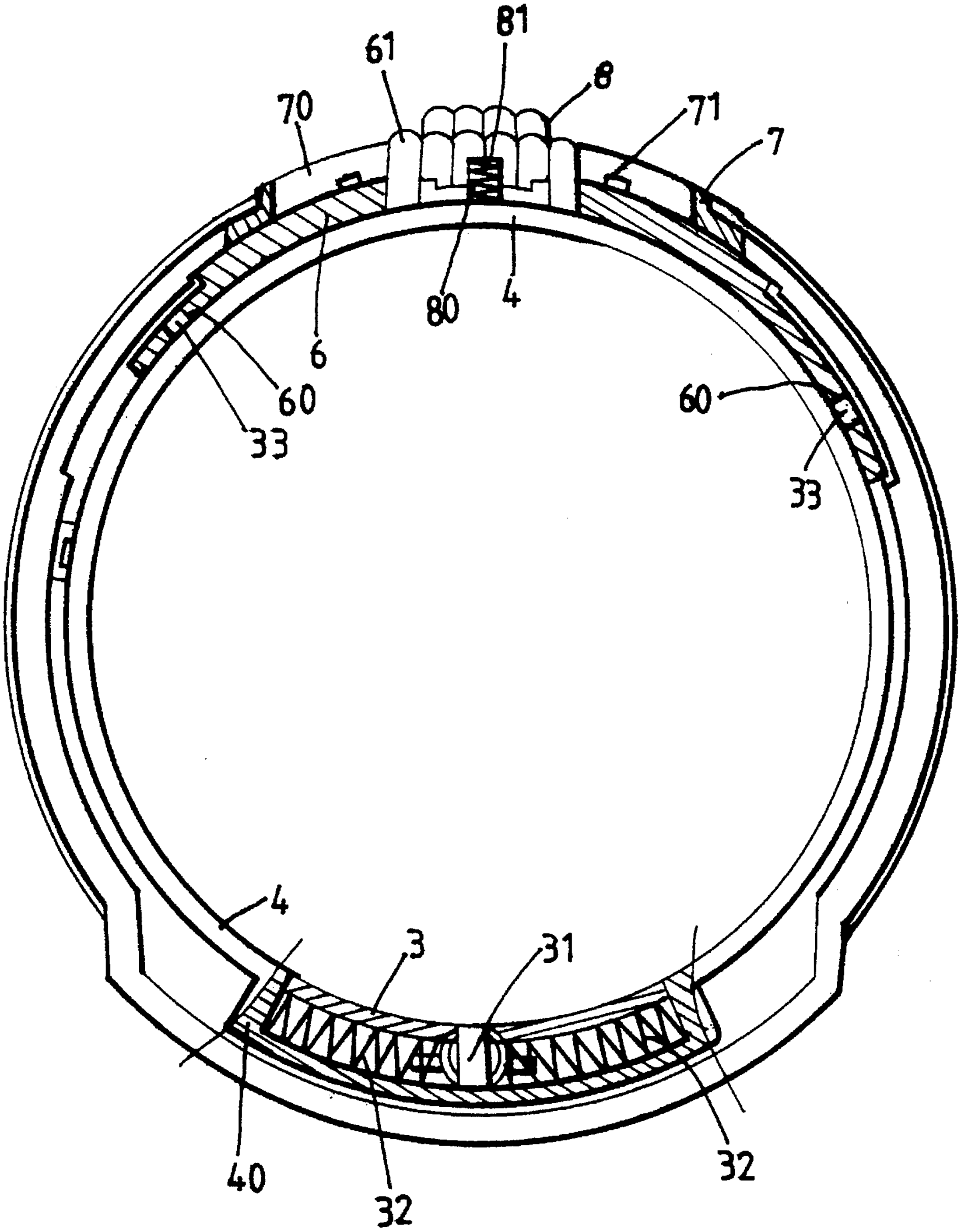
FIG. 6 shows a sectional view of the speed selecting device of the present invention.
Figure 7:
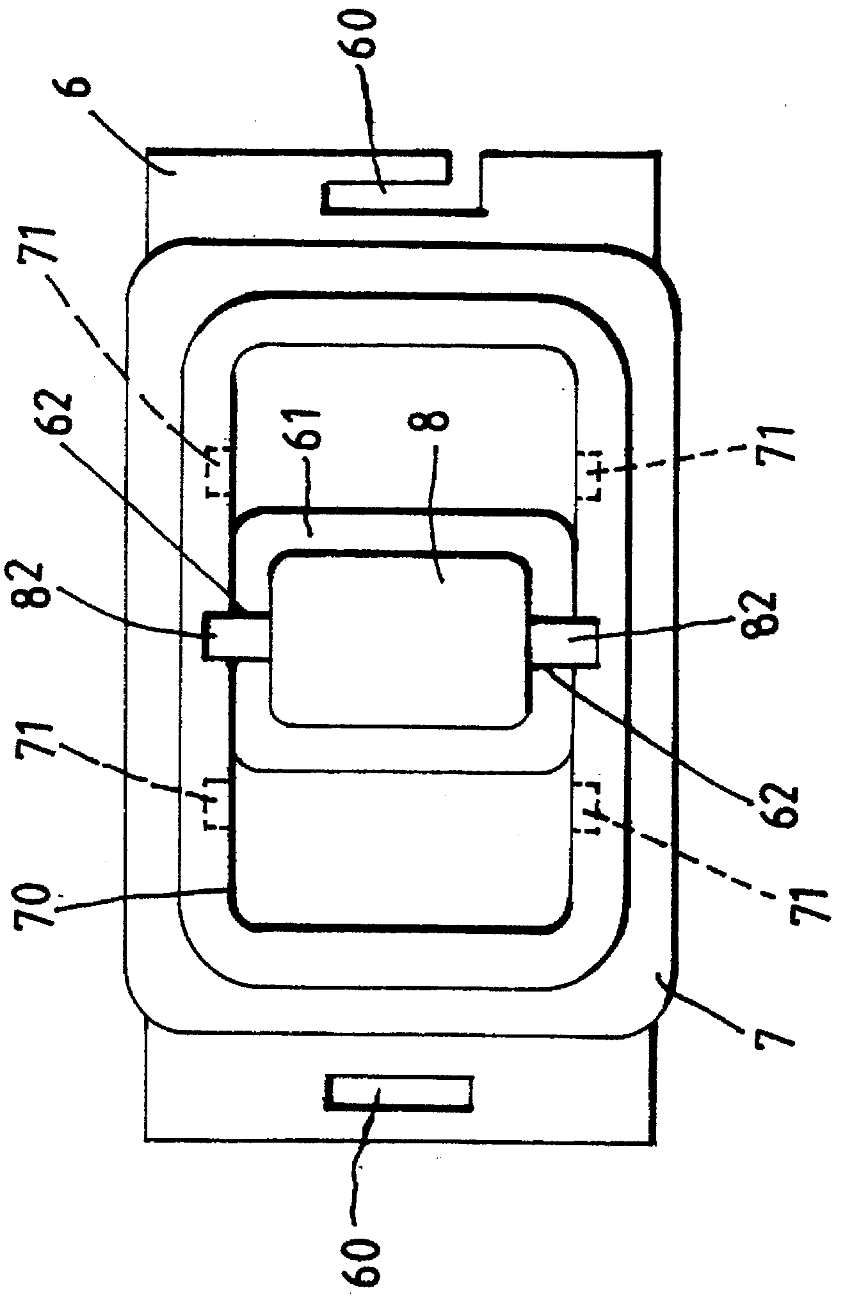
FIG. 7 shows a schematic view of the speed selecting device at work according to the present invention.

As shown in FIGS. 5–7, the speed selecting device of the present invention comprises a seat 6, a locating frame 7 and a push button 8. The seat 6 of an arcuate construction is provided respectively at both ends thereof with a fitting hole 60 engageable with the protruded piece 33 of the action ring 3. The seat 6 is provided centrally with a hollow protruded seat 61 which is provided with a receiving slot 62. The locating frame 7 is located over the seat 6 and is fastened to the body of the electric tool. The locating frame 7 is provided centrally with a long hole 70 dimensioned to receive therein the protruded seat 61. The locating frame 7 is further provided with two retaining slots 71 corresponding in location to each other. The push button 8 is provided therein with a slot 80 dimensioned to receive therein the spring 81. The push bottom 8 is further provided with two protuberances 82.

In combination, the push button 8 is disposed in the protruded seat 61 of the seat 6 such that the push button 8 is emerged from the long hole 70 of the locating frame 7, and that the protuberances 82 of the push button 8 are located under the locating frame 7. When the push button 8 and the protruded seat 61 are moved horizontally to the left and the right ends of the long hole 70, the protuberances 82 are caused to emerge from the receiving slot 62 and retained securely in the retaining slots 71. When a change in the revolving speed of the electric tool is called for, a slight pressure on the push button 8 can cause the protuberances 82 to disengage the retaining slots 71. The push button 8 can be pushed to another side where the protuberances 82 are forced by the spring 81 to move through the receiving slot 62 to be retained in another retaining slot 71. In the meantime, the action ring 3 and the locating ring 4 are also actuated to rotate appropriately so as to cause the sliding bars 51 to push the sliding toothed ring 24 back and forth until such time when the sliding bars 51 are moved respectively into the locating slots 43 which are located respectively at both ends of the slanted slot 42. As a result, the speed selecting device of the present invention is capable of causing the speed changing mechanism to operate with precision.

The change in the revolving speed of the electric tool of the present invention is attained by the slanted slot 42 of the locating ring 4, which is capable of actuating the slide rod 5 to move back and forth. When the slide rod 5 is located respectively at a high or low revolving position, the sliding bar 51 of the slide rod 5 is moved into the locating slot 43 and is restrained by the elastic force of the spring 32. As a result, the locating ring 4 can not be caused to turn in reverse by the reaction force which is brought about by the electric tool operating under a great torsional stress. The sliding toothed ring 24 can not be therefore caused to trip so as to ensure that the speed changing operation is carried out precisely. Furthermore, the push button 8 and the action ring 3 of the speed selecting device can be caused by the spring 32 to move to a low revolving position at such time when the sliding toothed ring 24 is not engaged with the fixing toothed sleeve 23 and when the locating ring 4 can not be actuated to turn. Therefore, when the electric tool is started, the locating ring 4 can be located while the sliding bar 51 is restrained in the locating slot 43 by the spring 32 without having to press continuously the push button. It is therefore readily apparent that the present invention has overcome the shortcomings of the prior art.

What is claimed is:

1. A control mechanism of revolving speed of an electric tool comprising a speed changing mechanism, a speed selecting device, a gear set seat, a first gear set, a second gear set engaged with said first gear set and, a third gear set engaged with said second gear set, a fixing toothed sleeve including a first inner ring teeth, and a sliding toothed ring including an outer ring teeth for engaging with the first inner ring teeth of said fixing toothed sleeve and including a second inner ring teeth for engaging with said second gear set;

wherein said speed changing mechanism is composed of an action ring, a locating ring, and two slides, said action ring being capable of actuating said locating ring to rotate, said locating ring provided correspondingly with two slots provided rearwardly with slanted slots, each of said slanted slots provided respectively at both ends thereof with a curved locating slot, said two slide rods provided respectively with a sliding piece and a sliding bar, said sliding bars each including a first end passing through said gear set seat and said fixing toothed sleeve to push said sliding toothed ring to move back and forth so as to engage and to disengage said outer ring teeth of said sliding toothed ring from the first inner ring teeth of said fixing toothed sleeve, said sliding bars each including a second end slidably engaged in said slanted slot so as to enable said sliding bar to move back and forth and to be located in said locating slot.

2. The control mechanism of revolving speed of an electric tool as defined in claim 1, wherein said action ring is provided with a sector piece which is in turn provided centrally with a spring seat for locating thereto two springs, said action ring further provided with two protruded pieces; and wherein said locating ring is provided with a sector seat which is of a hollow construction and is intended to receive therein said spring seat and said springs of said action ring in such a manner that both ends of said springs urge respectively both side walls of said sector seat and that said locating ring and said action ring can be actuated to turn together, said locating ring further provided with a reinforcing frame fastened thereto.

3. The control mechanism of revolving speed of an electric tool as defined in claim 1, wherein said speed selecting device is capable of actuating horizontally said action ring and said locating ring so as to cause said sliding bar to act on said sliding toothed ring to move back and forth; and wherein said speed selecting device is composed of a seat, a locating frame and a push button, said seat provided respectively at both ends thereof with a fitting hole dimensioned to receive therein said protruded piece of said action ring, said seat further provided centrally with a protruded seat of a hollow construction and having a receiving slot, said locating frame being located over said seat and fastened to a main body of an electric tool, said locating frame provided centrally with a long hole dimensioned to receive therein said protruded seat, said locating frame provided correspondingly with two retaining slots, said push button disposed in said protruded seat of said seat such that said push button is emerged from said long hole of said locating frame, said push button provided with two protuberances which are located under said locating frame such that said protuberances are exposed through said receiving slot and that said protuberances are retained securely in said retaining slots when said push button is moved horizontally to a left end and a right end of said long hole.

4. The control mechanism of revolving speed of an electric tool as defined in claim 1, wherein said gear set seat is provided correspondingly with long slots and strip holes, in which said sliding pieces and said sliding bars of said slide rods are received respectively such that said sliding bars are located in said ring slots of said sliding toothed ring via said strip holes so as to cause said action ring to actuate said locating ring, thereby causing said sliding toothed ring to move back and forth.

* * * * *